United States Patent [19]

Kikuchi

[11] Patent Number: 4,747,488

[45] Date of Patent: May 31, 1988

[54] HARD DISK CONTAINER

[76] Inventor: Shoji Kikuchi, c/o Tensho Electric Industrial Co., Ltd., No. 3-3,1-chome, Koyama, Shinagawa-ku, Tokyo, Japan

[21] Appl. No.: 937,626

[22] Filed: Dec. 1, 1986

[51] Int. Cl.⁴ .............................................. B65D 85/57
[52] U.S. Cl. ................................... 206/444; 206/309; 206/334; 206/454
[58] Field of Search ............... 206/309, 334, 444, 445, 206/454; 220/345, 346

[56] References Cited

U.S. PATENT DOCUMENTS

| | | | |
|---|---|---|---|
| 3,156,402 | 11/1964 | Dupuis | 206/204 |
| 3,164,428 | 1/1965 | Kesh | 220/345 X |
| 3,180,697 | 4/1965 | Mulch | 220/345 X |
| 3,776,410 | 12/1973 | Carlson | 206/459 |
| 3,833,406 | 9/1974 | White | 206/204 |
| 3,854,581 | 12/1974 | Jones, Jr. | 206/459 |
| 3,923,156 | 12/1975 | Wallestad | 206/454 |
| 4,043,451 | 8/1977 | Johnson | 206/334 |
| 4,061,228 | 12/1977 | Johnson | 206/454 |
| 4,101,027 | 7/1978 | Kohl et al. | 206/309 |
| 4,213,528 | 7/1980 | Kreutz et al. | 206/204 |
| 4,248,346 | 2/1981 | Johnson | 206/334 |
| 4,276,989 | 7/1981 | Hicks | 215/270 |
| 4,327,830 | 5/1982 | Patel et al. | 206/312 |
| 4,443,874 | 4/1984 | Steenberg | 206/312 |
| 4,484,692 | 11/1984 | Palermo et al. | 220/346 |
| 4,490,087 | 12/1984 | Ryan et al. | 206/454 |
| 4,519,501 | 5/1985 | Cerwin | 206/204 |
| 4,520,925 | 6/1985 | Johnson | 206/334 |
| 4,555,024 | 11/1985 | Voss et al. | 206/334 |
| 4,557,382 | 12/1985 | Johnson et al. | 206/444 |
| 4,574,950 | 3/1986 | Koe et al. | 206/334 |
| 4,588,086 | 5/1986 | Coe | 206/309 X |

OTHER PUBLICATIONS

"Desiccant Doubles as Mechanical Component", Chemical Engineering, Jul. 13, 1970.

Primary Examiner—Jimmy G. Foster
Attorney, Agent, or Firm—Wenderoth, Lind & Ponack

[57] ABSTRACT

A hard disk container has a container body including a box having openings at its upper and lower portions, an upper cover engaging the container body so as to close the upper opening of the container body and a lower cover engaging the container body so as to close the lower opening of the container body, the container body including a pair of approximately U-shaped notches provided on both ends of the container body and having a notch groove provided therein, pairs of lower protrusions provided on both ends of the outer walls of the container body and pairs of upper recesses provided in the inner walls of the container body at both ends so that the lower protrusions can engage the upper recesses, and a plurality of sliding grooves provided in the inner walls of the container body to slidably contain hard disks, the upper cover including pairs of disk supporting pieces provided on the inner face of the upper cover and resiliently engaging shoulders of the hard disks, and the upper and lower cover including means to tightly engage the container body.

2 Claims, 4 Drawing Sheets

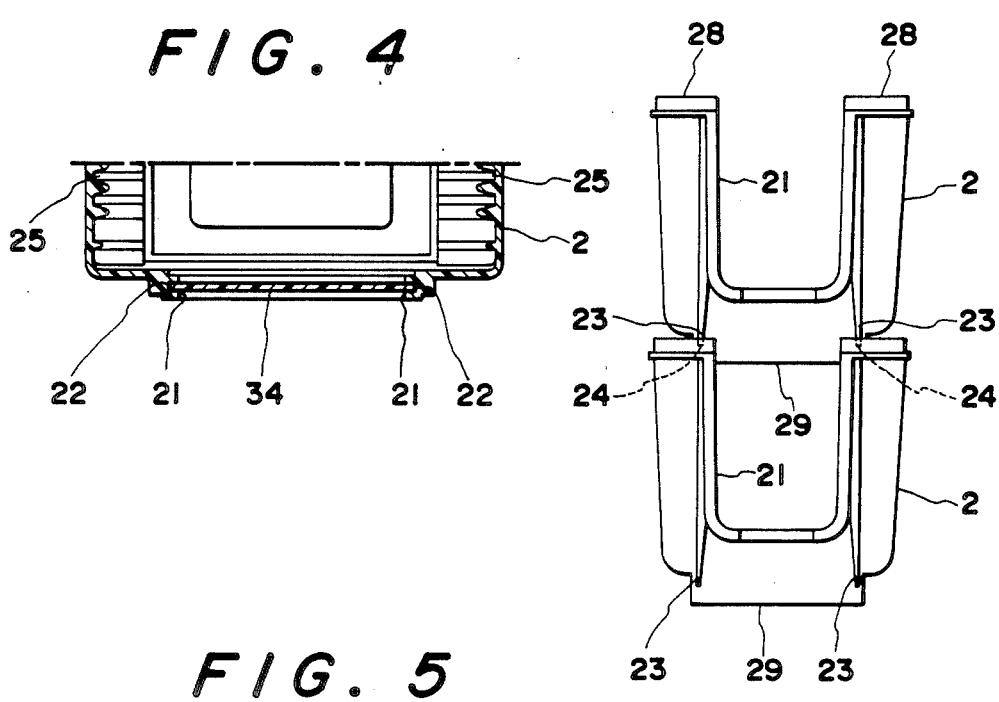
FIG. 4
FIG. 6
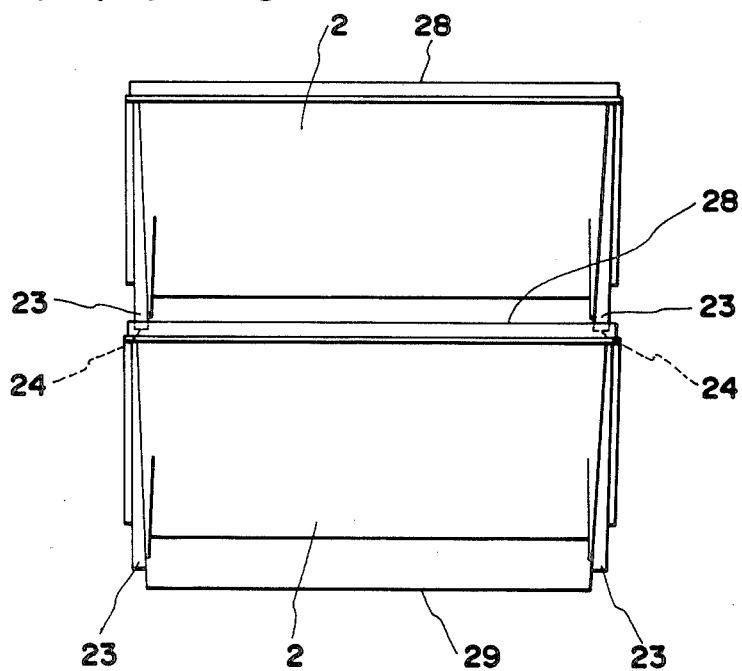
FIG. 5

HARD DISK CONTAINER

BACKGROUND OF THE INVENTION

This invention pertains to a hard disk container for transporting and/or preserving hard disks used as magnetic recording medium which are used as a memory for a computer, for example, and which comprise an aluminium non-magnetic plate in the form of a doughnut on which a magnetic layer is coated. The hard disk container may be used for a processing carrier in the course of producing the computer.

As shown in FIGS. 7 and 8, a hard disk container A which has heretofore been used comprises a container body B having parallel grooves B1 for containing hard disks, respectively and a notch for inserting a tool, an upper cover C having an engaging protrusion C1 provided thereon and a lower cover D having an engaging recess D1 complementary to the engaging protrusion C1 of the upper cover when the containers are superposed on one another.

However, the hard disk container of the prior art has a disadvantage that the upper and lower covers tend to be removed from of the container body due to vibration applied to the container when it is carried to a remote place because the upper and lower covers C and D loosely engage with the container body B. Thus, it will be noted that the hard disks may be removed from the container body and otherwise damaged due to the rolling movement in the container. In addition thereto, the container cannot be maintained air-tight, which causes dust to enter the container, the physical property of the hard disks to be adversely affected and the degree of cleanness of the hard disks to be lowered.

SUMMARY OF THE INVENTION

Accordingly, it is a principal object of the invention to provide a hard disk container which is not adversely affected due to vibration during its transport.

It is another object of the invention to provide a hard disk container adapted to be constructed in an air-tight manner and therefore which does not allow dust to enter the container.

In accordance with the present invention, there is provided a hard disk container comprising;

a container body including a box having openings at its upper and lower portions, said container body including a pair of approximately U-shaped notches provided on both end of said container body and having a notch groove provided therein, pairs of lower protrusions provided on both ends of the outer walls of said container body and pairs of upper recesses provided in the inner walls of said container body at both ends, said lower protrusions corresponding to said upper recesses so that said lower protrusions can engage said upper recesses, and a plurality of sliding grooves provided in said inner walls of said container body to slidably contain hard disks and having an arcuate configuration at the lower ends of said sliding grooves so as to correspond to the arcuate configuration of said hard disks, said sliding grooves having lower ends arcuately formed;

an upper cover including means provided thereon to tightly engage said container body and pairs of disk supporting pieces provided on the inner face of said upper cover and resiliently engaging shoulders of said hard disks;

and a lower cover including means provided thereon to tightly engage said container body.

BRIEF DESCRIPTION OF THE DRAWINGS

The above and other objects and features of the invention will be apparent from the description of the embodiment taken with reference to the accompanying drawings in which;

FIG. 4 is a cross sectional view of a portion of the hard disk container taken along the line IV—IV of FIG. 1;

FIG. 5 is a front view of two hard disk containers superposed on one another;

FIG. 6 is a side elevational view of the two hard disk containers of FIG. 5;

DETAILED DESCRIPTION OF THE EMBODIMENTS

Figure 1:
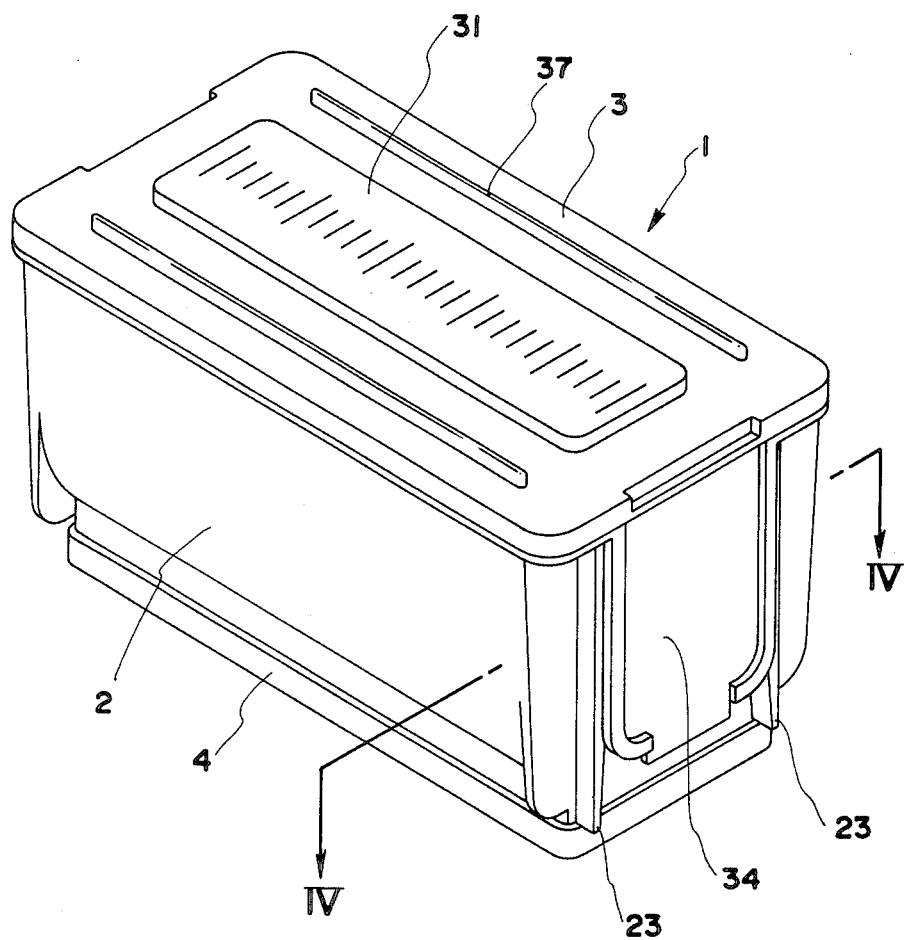
FIG. 1 is a perspective view of a hard disk container constructed in accordance with an embodiment of the invention.

Referring now to FIG. 1, there is shown a hard disk container 1 constructed in accordance with an embodiment of the invention. The container 1 comprises a container body 2, an upper cover 3 and a lower cover 4. The upper and lower covers 3 and 4 are adapted to be removably attached to the container body 2 to close it.

Figure 2:
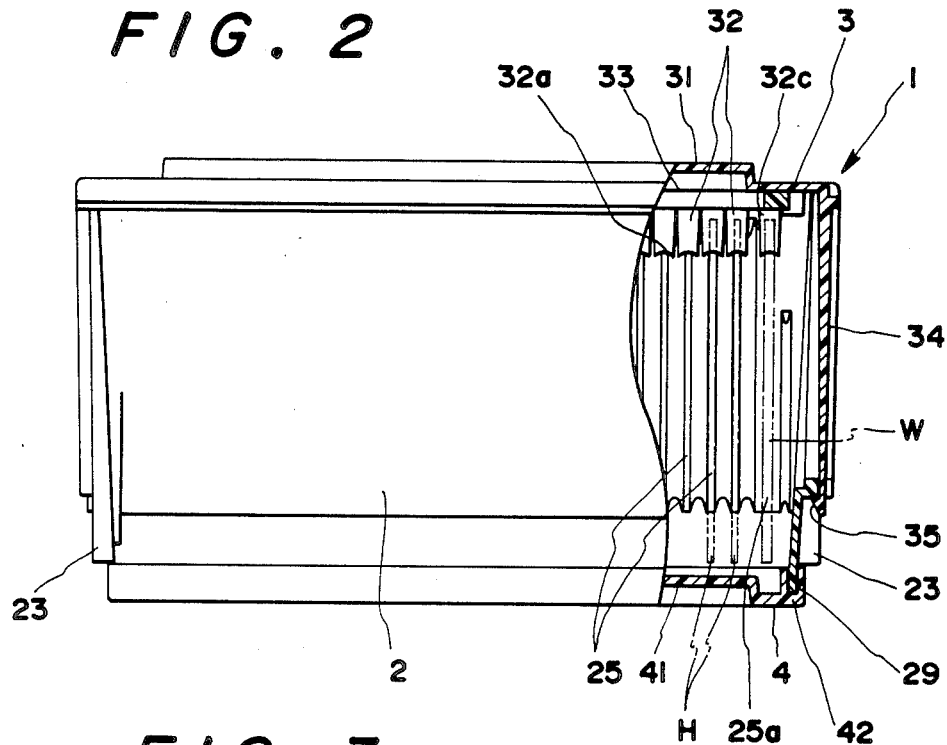
FIG. 2 is a side elevational view of the hard disk container of FIG. 1 with a portion broken away for explanation.
Figure 3:
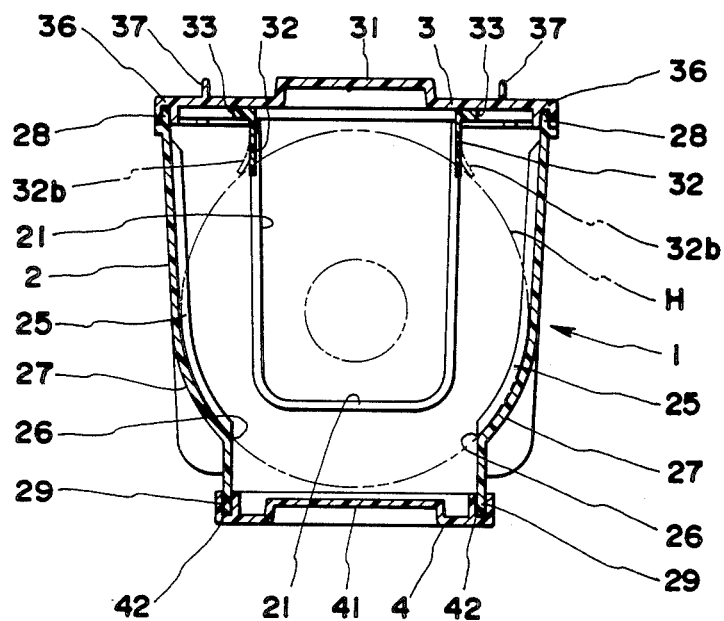
FIG. 3 is a cross sectional view of the hard disk container of FIG. 1.
Figure 7:
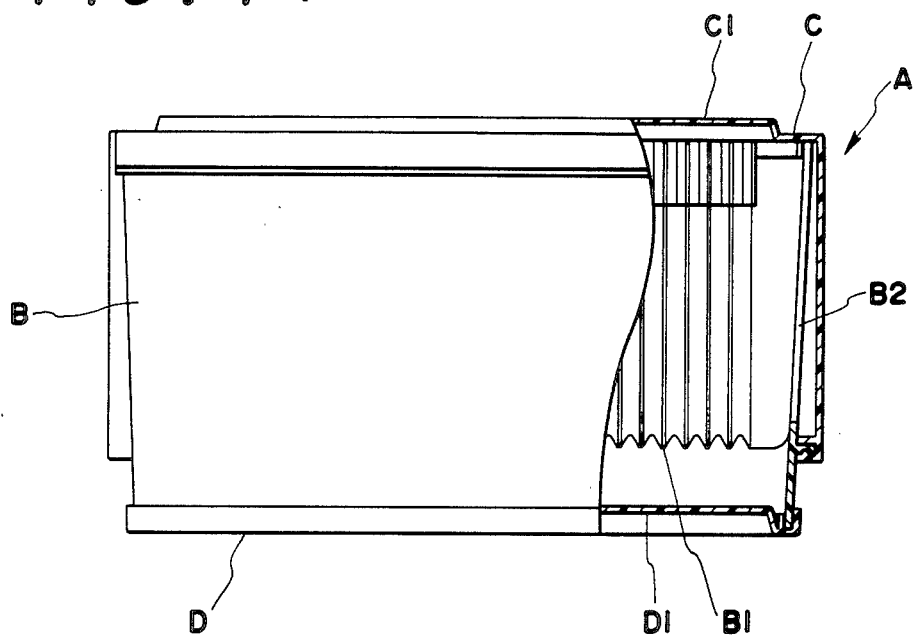
FIG. 7 is a side elevational view of a hard disk container of the prior art with a portion broken away.
Figure 8:
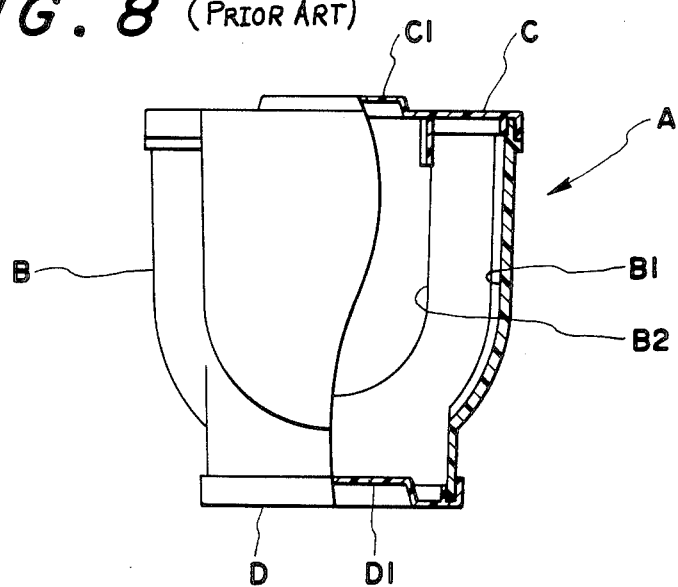
FIG. 8 is a front view of the hard disk container of FIG. 7.

As shown in FIGS. 2 and 3, the container body 2 may be in the form of box having openings provided at its upper and lower portions. The container body 2 has substantially U-shaped notches 21 in the end walls thereof which a tool (not shown) for inserting hard disks H and removing them from the container body 2 is adapted to engage. As shown in FIG. 4, the notches 21 each have a notch groove 22 provided in which tongues 34 are engaged as described later. As shown in FIGS. 5 and 6, pairs of protrusions 23 are formed on the container body at its side outer walls and pairs of recesses 24 are formed in the container body at the upper edges of the walls. The protrusions 23 and recesses 24 serve to superpose the upper container on the lower container by engaging with each other. Sliding grooves 25 are longitudinally spaced and formed in the opposed inner walls of the container body 2 for containing the hard disks H in the form of doughnut therein in a vertical manner. It should be noted that the inner walls of the container body 2 including the sliding grooves 25 are arcuately formed corresponding to the configuration of the hard disks H. The lower ends of the sliding grooves 25 are formed in a fully arcuate manner.

The upper cover 3 has a protrusion 31 provided at its center. The upper cover 3 includes a plurality of pairs of disk supporting pieces 32 provided on its inner wall to prevent the hard disks H from being moved in the sliding grooves 25 of the container body 2, respectively. The disk supporting pieces 32 may be secured by a base 33 to the upper cover 3. The disk supporting pieces 32 may be provided with a recess 32a for positively engaging the shoulders of the hard disks H. Also, the disk supporting pieces 32 may be formed of soft and resilient material so that the disk supporting pieces 32 can extend outwardly as indicated by a numeral 32b in FIG. 3 when the upper cover 3 is engaged with the container body 2 to positively hold the hard disks H in a resilient manner. Furthermore, the upper cover 3 has a pair of depending tongues 34 at the opposite ends which are adapted to slidably and closely engage in the notch grooves 22. The depending tongues 34 at their lower ends may be provided with hooks 35 which engage the lower edges of the notches 21. The upper cover 3 at its periphery may be preferably provided with an engaging groove 36 which engages an upper edge 28 of the container body 2.

The lower cover 4 has a recess 41 provided at its center to loosely engage the protrusion 31 of the upper cover 3. Thus, it will be noted that a plurality of containers 1 can be vertically superposed on one another with the recess 41 of the lower cover 4 of the upper container 1 engaging the protrusion 31 of the upper cover 3 of the lower container 1, which causes the containers to be convenient for their transportation. Also, the lower cover 4 at its periphery may be preferably provided with an engaging groove 42 which engages a lower edge 29 of the container body 2.

When the upper cover 3 is removed from the container body 2, the hooks 35 (which serve as a handle for its removal) are disengaged from the lower edges of the notches 21 of the container body 2 and then the depending tongues 34 are upwardly and slidably moved along the notch grooves 22 of the container body 2.

A pair of projections 37 may be preferably provided on the upper cover 3 to loosely engage the side walls of the lower cover 4 of the upper container 1 when the protrusion 31 of the upper cover 3 engages the recess 41 of the lower cover 3 of the upper container 1. The pair of projections serve to more stably superpose the hard disk containers 1 on one another.

As shown in FIG. 1, graduations may be preferably provided on the outer face of the protrusion 31 at the positions corresponding to the sliding grooves 25 to enable an easy management of the hard disks. The graduations may be replaced by another indication such a scale and/or figures.

Humidity absorber material may be contained in the hard disk container 1 to prevent the hard disks from being damaged due to humidity while they are transported and/or preserved. The humidity absorber may be generally of silica-gel, which tends to be scattered as pulverized dust, but may be more preferably in the form of sheet having a configuration similar to that of the hard disk H. Such humidity aborber may be produced by enclosing silica-gel with synthetic resin. The humidity absorber in the form of a sheet never produces pulverized dust and advantageously absorbs humidity at higher speed. Furthermore, such humidity absorber is convenient for handling because it has the configuration similar to that of the hard disk. For example, as shown in FIG. 2, a humidity absorber containing groove 25 having a configuration similar to those of the sliding grooves 25 may be provided in the container body 2 to contain a humidity absorber W in the form of a sheet and a pair of humidity absorber supporting pieces 32c having a construction similar to those of the disk supporting pieces 32 may be provided on the upper cover 3 to positively hold the humidity absorber W. A plurality of humidity absorber containing grooves 25a and pairs of supporting pieces 32c may be provided so as to contain and positively hold a plurality of humidity absorbers W in the form of sheets.

It will be noted that the upper and lower covers 3 and 4 can be positively secured to the container body 2 because the pair of tongues 34 of the upper cover 3 closely engage the notch grooves 22 of the container body 2 with the latching hooks 35 engaging the notch 21 of the container body 2 and with the engaging groove 36 of the upper cover 3 closely engaging the upper edge of the container body 2 and because the engaging groove 42 of the lower cover 4 closely engages the lower edge of the container body 2. Thus, the upper and lower covers 3 and 4 will not come off the container body 2 in spite of severe vibration applied to the container when it is transported with the result that the hard disks in the container are prevented from being damaged. Furthermore, since the container is tightly closed, dust and/or humidity are effectively prevented from entering the container and the humidity absorber will have a longer life.

In addition thereto, the hard disks are positively held by means of the configuration and resilient engagement of the disk supporting pieces while prevented from being damaged because of the arcuate ends of the sliding grooves.

The hard disk containers can be easily superposed on one another while the upper and lower covers engage the container body or even while they don't engage it. Thus, it will be noted that they are convenient for packing and preserving the hard disks and for removing the hard disks from the containers when the computer is used.

While one embodiment of the invention has been described and illustrated with reference to the accompanying drawings, it should be noted that it is by way of example, and that various changes and modifications may be made without departing from the spirit and scope of the invention, which is intended to be defined only by the appended claims.

What is claimed is:

1. A hard disk container comprising:
   a container body having a plurality of spaced parallel U-shaped disk receiving grooves provided in an inner surface thereof and having end openings provided in opposite ends thereof to expose central holes of the hard disks therethrough and having upper and lower openings provided in upper and lower portions thereof, said end walls having elongated grooves opening toward each other along the spaced opposed edges of said end walls defining said end openings, and the lower edges of said end openings having an undercut portion therebeneath;
   an upper cover removably mounted on the upper portion for closing said upper opening and having depending tongues on opposite ends thereof which, when said upper cover is in position, engage in said elongated grooves and tightly close said end openings;
   said depending tongues each having a latch means on the lower end thereof engaging the corresponding undercut portion when said tongues are fully inserted in said end openings.

2. A hard disk container as claimed in claim 1 in which said container body has at least one further U-shaped disk receiving groove and a humidity absorber in the shape of a disk in said groove.

* * * * *